(12) United States Patent
Busch

(10) Patent No.: US 6,295,765 B1
(45) Date of Patent: Oct. 2, 2001

(54) MOVABLE SHELTER

(76) Inventor: Michael H. Busch, 14762 S. Steep Mountain Dr., Draper, UT (US) 84020

( * ) Notice: Subject to any disclaimer, the term of this patent is extended or adjusted under 35 U.S.C. 154(b) by 0 days.

(21) Appl. No.: 09/616,922

(22) Filed: Jul. 14, 2000

(51) Int. Cl.[7] ................................................. E04B 1/346
(52) U.S. Cl. .................................. 52/65; 52/64; 119/438
(58) Field of Search .................. 52/64, 65, 1; 472/22, 472/6, 1, 29; 119/438, 436

(56) References Cited

U.S. PATENT DOCUMENTS

| | | |
|---|---|---|
| D. 340,551 | 10/1993 | Mitchell, Sr. . |
| 493,355 | 3/1893 | Erickson . |
| 3,645,235 | 2/1972 | Suchla . |
| 3,648,980 | 3/1972 | Taylor . |
| 3,893,337 * | 7/1975 | Jones ........................................ 73/188 |
| 4,637,344 | 1/1987 | Peterson . |
| 4,969,300 | 11/1990 | Pope . |
| 5,562,459 * | 10/1996 | Durlach ................................. 434/402 |
| 6,085,475 * | 7/2000 | Parks et al. ........................... 52/169.6 |

FOREIGN PATENT DOCUMENTS

19650278-A1 * 6/1998 (DE) .

* cited by examiner

*Primary Examiner*—Carl D. Friedman
*Assistant Examiner*—Naoko Slack

(57) ABSTRACT

A movable shelter for providing a shelter for animals that would be dry and warm. The movable shelter includes a base member including a first sprocket adapted to be rotatably mounted upon a ground such as a cement slab and also including a shaft securely mounted to the first sprocket for rotation therewith and being adapted to be generally perpendicular to the ground; and also includes a building structure having a floor, side walls, front wall, back wall, a roof, and an opening in the front wall with the building structure being securely mounted upon the shaft for rotation therewith; and further includes a rotation assembly for rotating the building structure.

13 Claims, 4 Drawing Sheets

MOVABLE SHELTER

BACKGROUND OF THE INVENTION

1. Field of the Invention

The present invention relates to an adaptive shelter and more particularly pertains to a new movable shelter for providing a shelter for animals that would be dry and warm.

2. Description of the Prior Art

The use of an adaptive shelter is known in the prior art. More specifically, an adaptive shelter heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,645,235; 4,637,344; 493,355; 4,969,300; 3,648,980; and Des. 340,551.

While these devices fulfill their respective, particular objectives and requirements, the aforementioned patents do not disclose a new movable shelter. The inventive device includes a base member including a first sprocket adapted to be rotatably mounted upon a ground such as a cement slab and also including a shaft securely mounted to the first sprocket for rotation therewith and being adapted to be generally perpendicular to the ground; and also includes a building structure having a floor, side walls, front wall, back wall, a roof, and an opening in the front wall with the building structure being securely mounted upon the shaft for rotation therewith; and further includes a rotation assembly for rotating the building structure.

In these respects, the movable shelter according to the present invention substantially departs from the conventional concepts and designs of the prior art, and in so doing provides an apparatus primarily developed for the purpose of providing a shelter for animals that would be dry and warm.

SUMMARY OF THE INVENTION

In view of the foregoing disadvantages inherent in the known types of adaptive shelter now present in the prior art, the present invention provides a new movable shelter construction wherein the same can be utilized for providing a shelter for animals that would be dry and warm.

The general purpose of the present invention, which will be described subsequently in greater detail, is to provide a new movable shelter which has many of the advantages of the adaptive shelter mentioned heretofore and many novel features that result in a new movable shelter which is not anticipated, rendered obvious, suggested, or even implied by any of the prior art adaptive shelter, either alone or in any combination thereof.

To attain this, the present invention generally comprises a base member including a first sprocket adapted to be rotatably mounted upon a ground such as a cement slab and also including a shaft securely mounted to the first sprocket for rotation therewith and being adapted to be generally perpendicular to the ground; and also includes a building structure having a floor, side walls, front wall, back wall, a roof, and an opening in the front wall with the building structure being securely mounted upon the shaft for rotation therewith; and further includes a rotation assembly for rotating the building structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new movable shelter which has many of the advantages of the adaptive shelter mentioned heretofore and many novel features that result in a new movable shelter which is not anticipated, rendered obvious, suggested, or even implied by any of the prior art adaptive shelter, either alone or in any combination thereof.

It is another object of the present invention to provide a new movable shelter which may be easily and efficiently manufactured and marketed.

It is a further object of the present invention to provide a new movable shelter which is of a durable and reliable construction.

An even further object of the present invention is to provide a new movable shelter which is susceptible of a low cost of manufacture with regard to both materials and labor, and which accordingly is then susceptible of low prices of sale to the consuming public, thereby making such movable shelter economically available to the buying public.

Still yet another object of the present invention is to provide a new movable shelter which provides in the apparatuses and methods of the prior art some of the advantages thereof, while simultaneously overcoming some of the disadvantages normally associated therewith.

Still another object of the present invention is to provide a new movable shelter for providing a shelter for animals that would be dry and warm.

Yet another object of the present invention is to provide a new movable shelter which includes a base member including a first sprocket adapted to be rotatably mounted upon a ground such as a cement slab and also including a shaft securely mounted to the first sprocket for rotation therewith and being adapted to be generally perpendicular to the ground; and also includes a building structure having a floor, side walls, front wall, back wall, a roof, and an opening in the front wall with the building structure being securely mounted upon the shaft for rotation therewith; and further includes a rotation assembly for rotating the building structure.

Still yet another object of the present invention is to provide a new movable shelter that allows the animals to have a shelter that will always be dry, warm and out of the wind.

Even still another object of the present invention is to provide a new movable shelter that is convenient and easy to erect upon a solid ground such as a cement slab.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
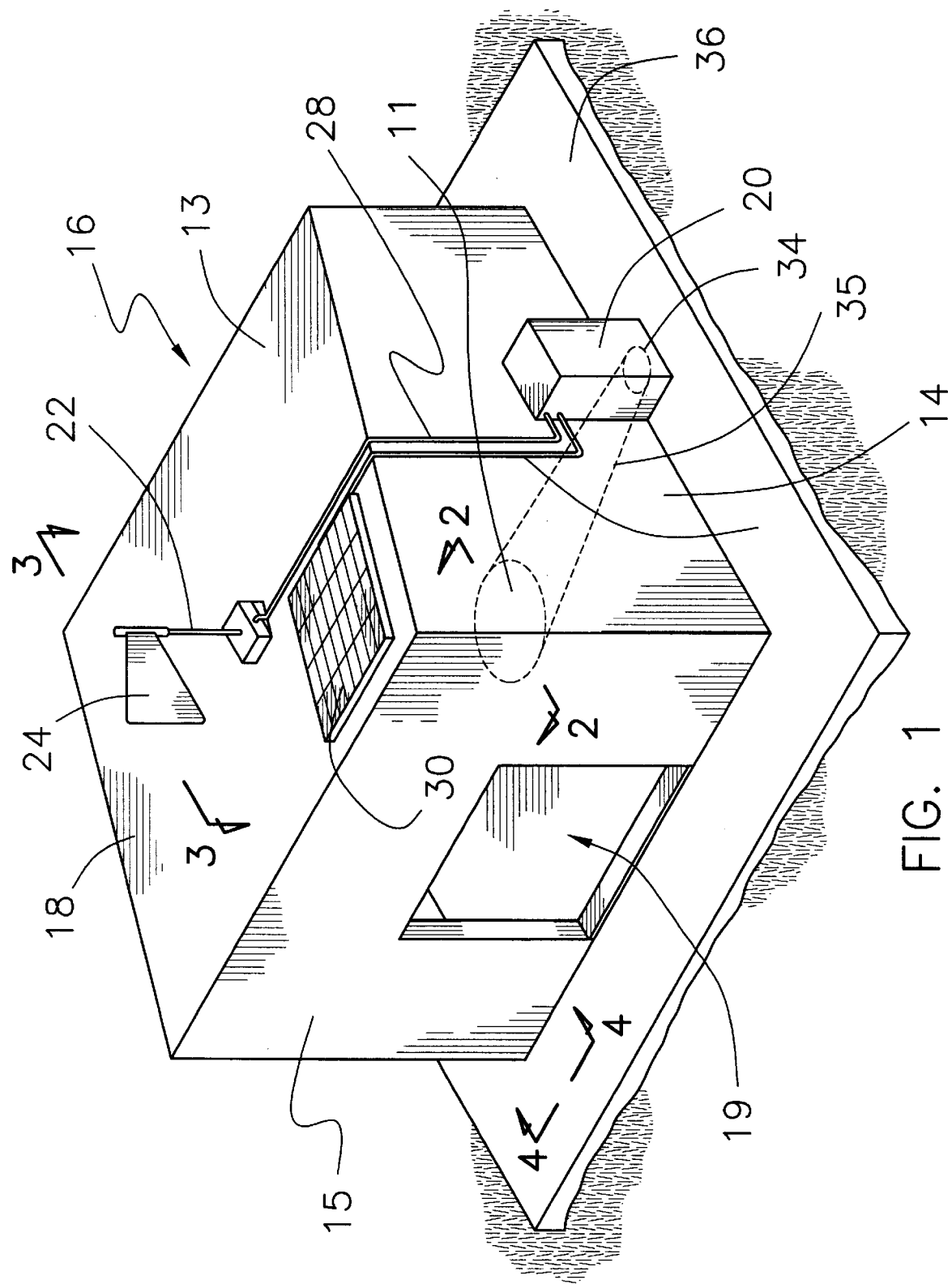
FIG. 1 is a perspective view of a new movable shelter according to the present invention.
Figure 2:
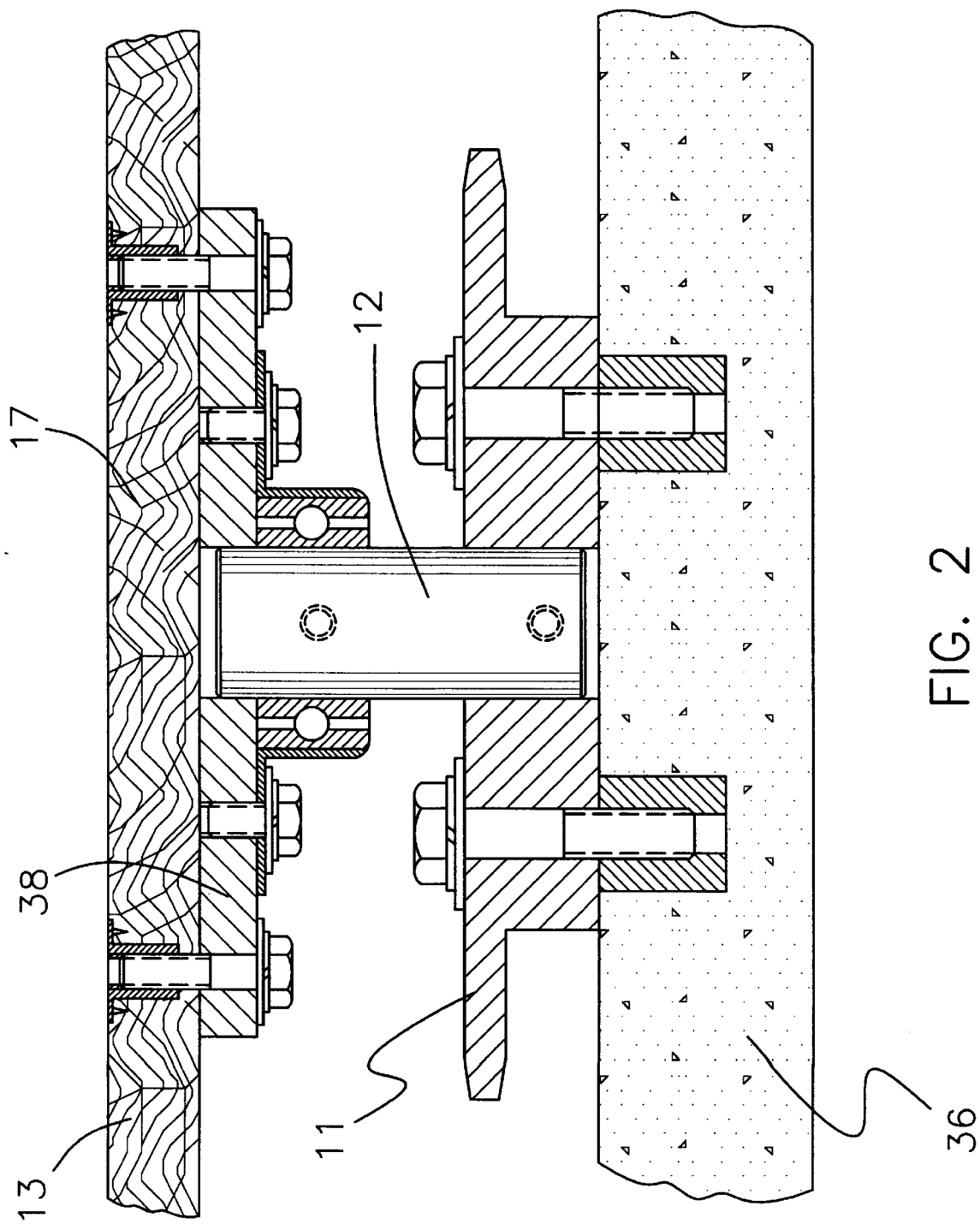
FIG. 2 is a cross-sectional view of the floor including support member, base member and ground of the present invention.
Figure 3:
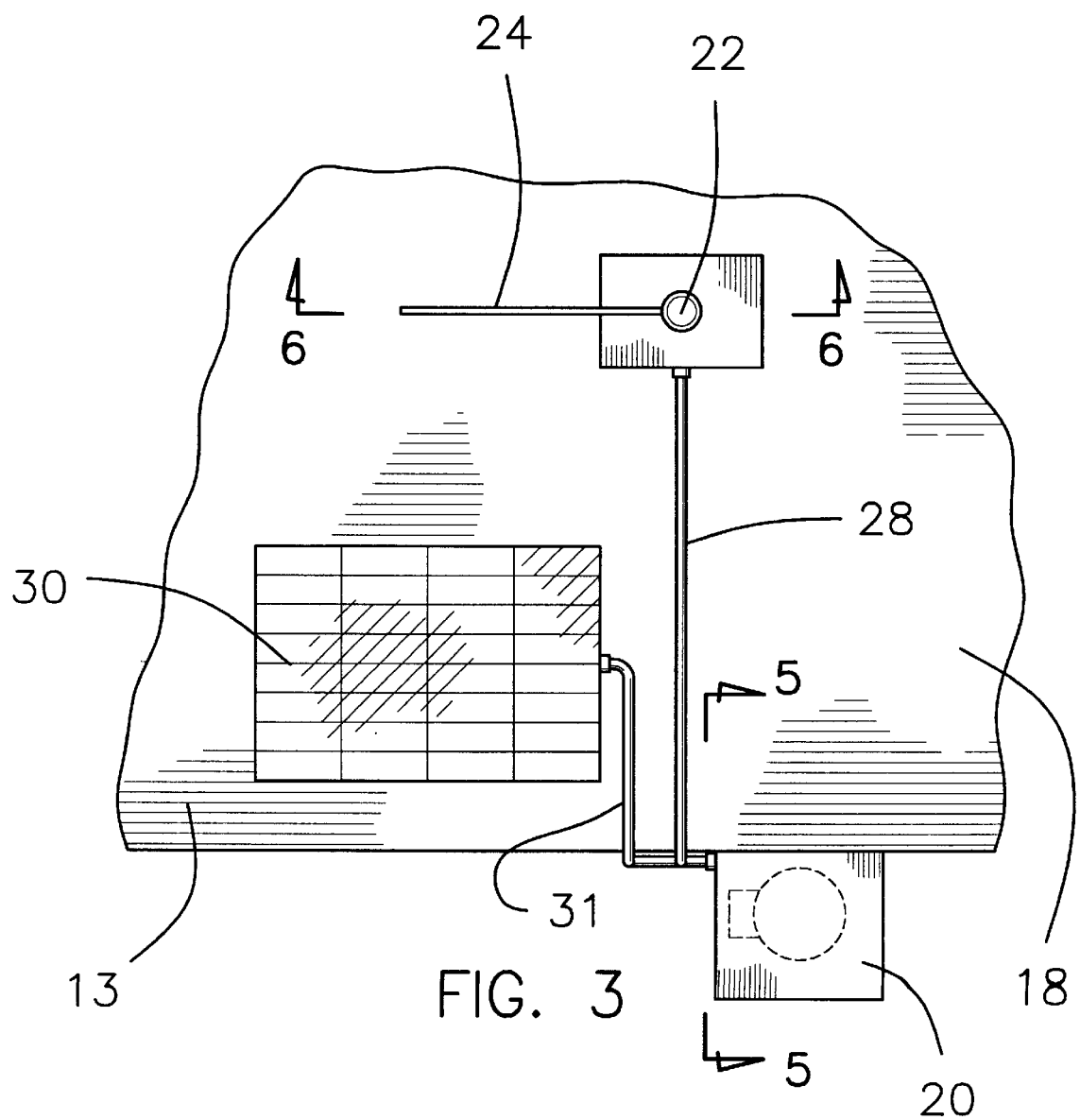
FIG. 3 is a detailed top plan view of the wind sensing means and the solar panels of the present invention.
Figure 4:
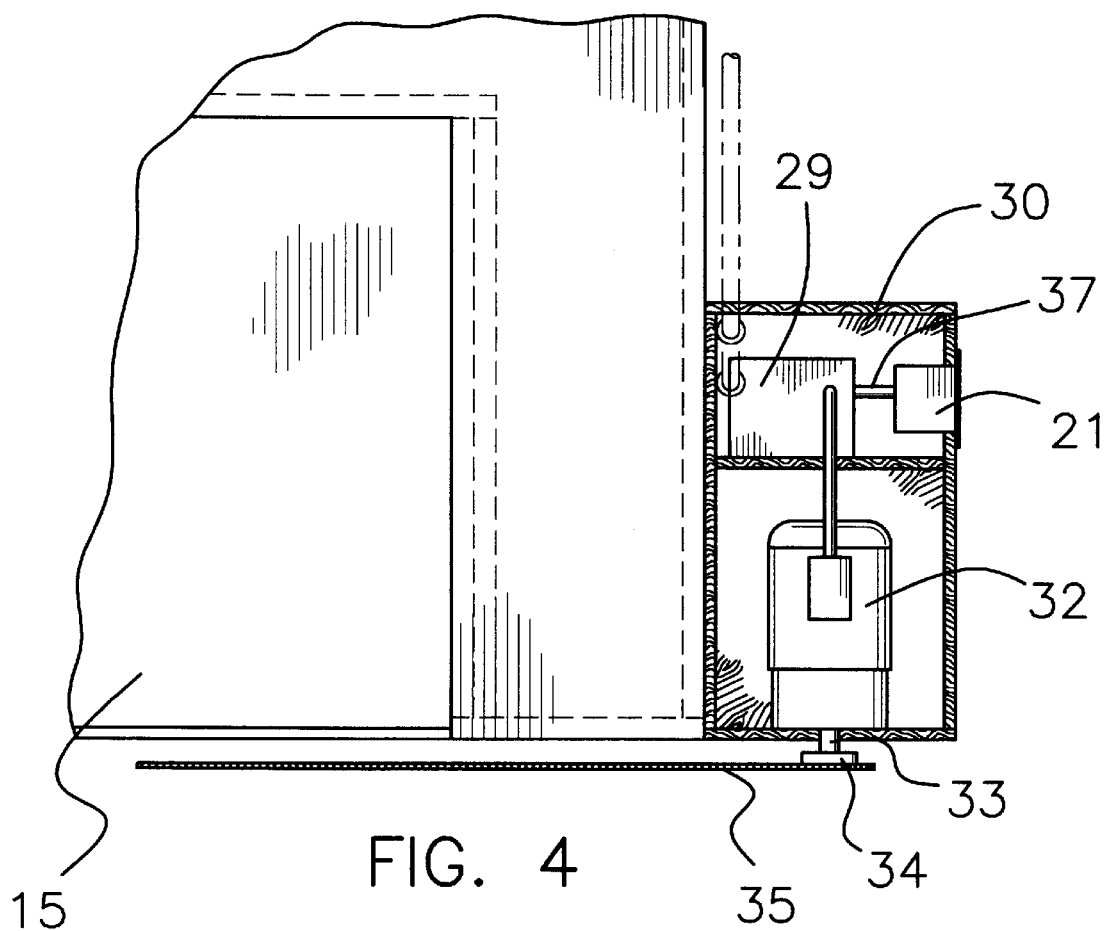
FIG. 4 is a cross-sectional view of the housing of the present invention.
Figure 5:
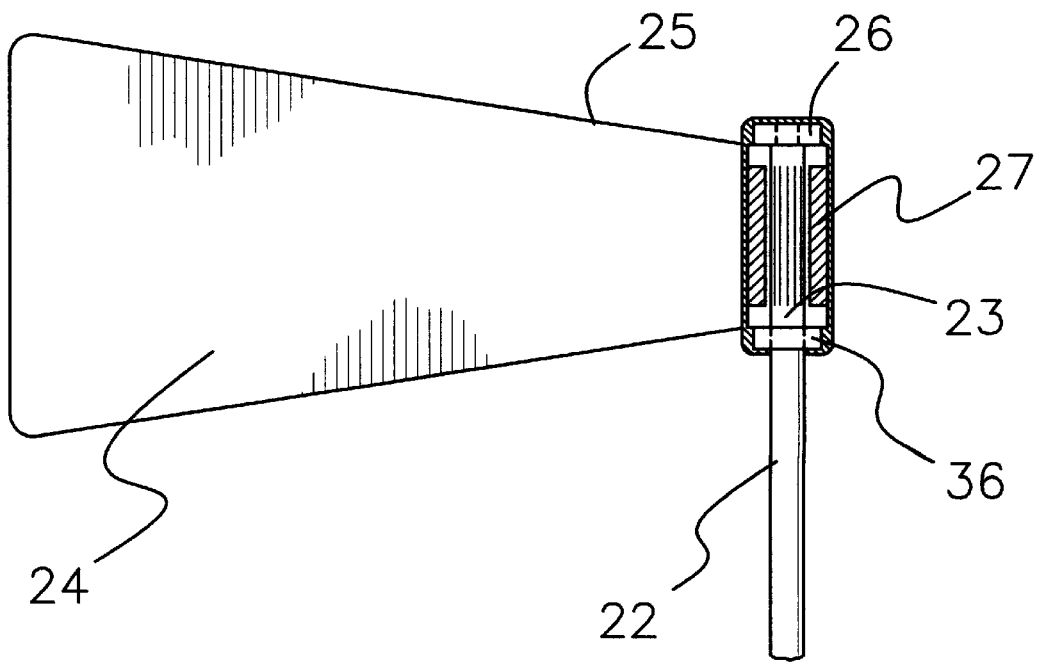
FIG. 5 is a detailed side elevational view of the wind sensing means of the present invention.

With reference now to the drawings, and in particular to FIGS. 1 through 5 thereof, a new movable shelter embodying the principles and concepts of the present invention and generally designated by the reference numeral 10 will be described.

As best illustrated in FIGS. 1 through 5, the movable shelter 10 generally comprises a base member 11, 12 including a first sprocket 11 adapted to be rotatably and securely mounted with fasteners upon a ground 36 such as cement slab, and also including a shaft 12 securely and conventionally mounted to the first sprocket 11 for rotation therewith and being adapted to be disposed generally perpendicular to the ground 36. The movable shelter 10 also comprises a building structure 13 having a floor 17, side walls 14, front wall 15, back wall 16, a roof 18, and an opening 19 in the front wall 15 with the building structure 13 being securely and conventionally mounted upon the shaft 12 for rotation therewith. The building structure 13 includes a support member 38 securely attached with fasteners to and centrally-disposed upon a bottom side of the floor 17. The shaft 12 includes a top portion which is securely and centrally disposed in the support member 38. The roof 18 of the building structure 13 is slanted downwardly from the front wall 15 to the back wall 16 with the floor 17 of the building structure 13 being adapted to be elevated upon the ground 36. The building structure 13 measures approximately 15 square feet and has a height of approximately 10 feet.

A means for rotating the building structure 13 includes a housing 20 securely and conventionally attached to one of the side walls 14 of the building structure 13, and also includes a control unit including a microprocessor unit 21 securely and conventionally disposed inside the housing 20, and further includes a power source conventionally connected to the control unit, and also includes a motor 32 having a rotatable motor shaft 33 and being conventionally connected to the power source, and further includes a second sprocket 34 being securely and conventionally mounted to the motor shaft 33, and also includes an endless chain 35 carried about the first 11 and second 34 sprockets. The control unit further includes a means for sensing wind direction which includes an elongate support member 22 securely and conventionally mounted upon the roof 18 and extending upwardly therefrom, a weather vane member 24 having an end 25 being pivotally mounted with bearings 26 about a top portion 23 of the elongate support member 22, and a directional sensor 27 securely and conventionally mounted to the end 25 of the weather vane member 24 about the top portion 23 of the elongate support member 22 and being connected with an electrical conduit 28 to the microprocessor unit 21. The first sprocket 11 is relatively larger than the second sprocket 34. The power source includes a battery 29 securely and conventionally disposed inside the housing 20 and being connected to the motor 32 and to the microprocessor unit 21 with wires 37, and also includes solar panels 30 securely and conventionally mounted upon the roof 18 and being connected to the battery 29 with an electrical conduit 31 for transferring electrical energy to the battery 29.

In use, the building structure 13 will automatically rotate depending upon the direction of the wind with the back wall 16 facing into the wind and the opening 19 in the front wall 15 facing away from the wind so that animals can be protected against the elements of the environment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A movable shelter comprising:
   a base member including a first sprocket adapted to be rotatably mounted upon a solid ground such as a cement slab, and also including a shaft securely mounted to said first sprocket for rotation therewith and being adapted to be generally perpendicular to the ground;

a building structure having a floor, side walls, front wall, back wall, a roof, and an opening in said front wall, said building structure being securely mounted upon said shaft for rotation therewith; and a means for rotating said building structure;

means for controlling rotation of said building structure by said means for rotating said building structure, said means for controlling rotation of said building structure including means for sensing wind direction mounted on the roof of said building structure, and a processor for receiving wind direction information from said means for sensing wind direction for determining if the back wall is oriented toward a direction from which the wind is blowing, said processor sending rotation signals to said means for rotating said building structure when said processor determines that the back wall is not oriented toward the direction from which the wind is blowing.

2. A movable shelter as described in claim 1, wherein said building structure includes a support member securely attached to and centrally-disposed upon a bottom side of said floor.

3. A movable shelter as described in claim 2, wherein said shaft includes a top portion which is securely and centrally disposed in said support member, said support member being essentially a plate-like member.

4. A movable shelter as described in claim 1, wherein said means for rotating said building structure includes a housing securely attached to one of said side walls of said building structure, and also includes a motor having a rotatable motor shaft, and further includes a second sprocket being securely mounted to said motor shaft, and also includes an endless chain carried about said first and second sprockets.

5. A movable shelter as described in claim 1, wherein said means for sensing wind direction includes an elongate support member securely mounted upon said roof and extending upwardly therefrom, a weather vane member having an end being pivotally mounted about a top portion of said elongate support member, and a directional sensor securely mounted to said end of said weather vane member about said top portion of said elongate support member and being connected to said processor.

6. A movable shelter as described in claim 4, wherein said first sprocket is relatively larger than said second sprocket.

7. A movable shelter as described in claim 4, wherein said means for rotating said building structure additionally includes a power source comprising a battery securely disposed inside said housing and being connected to said motor and to said processor, and also includes solar panels securely mounted upon said roof and being connected to said battery with an electrical conduit for transferring electrical energy to said battery.

8. A movable shelter as described in claim 1, wherein said roof of said building structure slants downwardly from said front wall to said back wall such that wind resistance of said building structure is minimized when the back wall of said building structure is oriented toward the direction of the wind.

9. A movable shelter as described in claim 1, wherein said floor of said building structure is adapted to be elevated above the ground.

10. A movable shelter as described in claim 1, wherein said roof is substantially planar from the back wall of said building structure to the front wall of said building structure, said means for sensing wind direction being positioned in a substantially central location of said roof for minimizing interference with wind direction sensing by wind deflections caused by an exterior surface of said roof.

11. A movable shelter as described in claim 1, wherein the front wall of said building structure has a greater surface area than the back wall of said building structure for minimizing wind resistance of said building structure when the rear wall of said building structure is oriented toward the direction from which the wind is blowing.

12. A movable shelter comprising:

a base member including a first sprocket adapted to be rotatably mounted upon a solid ground such as a cement slab, and also including a shaft securely mounted to said first sprocket for rotation therewith and being adapted to be generally perpendicular to the ground;

a building structure having a floor, side walls, front wall, back wall, a roof, and an opening in said front wall, said building structure being securely mounted upon said shaft for rotation therewith; and a means for rotating said building structure;

means for controlling rotation of said building structure by said means for rotating said building structure, said means for controlling rotation of said building structure including means for sensing wind direction mounted on the roof of said building structure, and a processor for receiving wind direction information from said means for sensing wind direction for determining if the back wall is oriented toward a direction from which the wind is blowing, said processor sending rotation signals to said means for rotating said building structure when said processor determines that the back wall is not oriented toward the direction from which the wind is blowing;

wherein said means for sensing wind direction includes an elongate support member securely mounted upon said roof and extending upwardly therefrom, a weather vane member having an end being pivotally mounted about a top portion of said elongate support member, and a directional sensor securely mounted to said end of said weather vane member about said top portion of said elongate support member and being connected to said processor;

wherein said roof of said building structure slants downwardly from said front wall to said back wall such that wind resistance of said building structure is minimized when the back wall of said building structure is oriented toward the direction of the wind;

wherein said roof is substantially planar from the back wall of said building structure to the front wall of said building structure, said means for sensing wind direction being positioned in a substantially central location of said roof for minimizing interference with wind direction sensing by wind deflections caused by an exterior surface of said roof; and wherein the front wall of said building structure has a greater surface area than the back wall of said building structure for minimizing wind resistance of said building structure when the rear wall of said building structure is oriented toward the direction from which the wind is blowing.

13. A movable shelter as described in claim 12, wherein said building structure includes a support member securely attached to and centrally-disposed upon a bottom side of said floor;

wherein said shaft includes a top portion which is securely and centrally disposed in said support member, said support member being essentially a plate-like member;

wherein said means for rotating said building structure includes a housing securely attached to one of said side walls of said building structure, a motor having a rotatable motor shaft, a second sprocket being securely mounted to said motor shaft, and an endless chain carried about said first and second sprockets;

wherein said first sprocket is relatively larger than said second sprocket; and wherein said means for rotating said building structure additionally includes a power source comprising a battery securely disposed inside said housing and being connected to said motor and to said processor, and also includes solar panels securely mounted upon said roof and being connected to said battery with an electrical conduit for transferring electrical energy to said battery.

* * * * *